Inventor
Jacques Jean Valentin Charles
DEVISME
By Pierre Lespérance
Agent

United States Patent Office 3,475,875
Patented Nov. 4, 1969

3,475,875
SYSTEM FOR ASSEMBLING COMPONENTS FOR THE CONSTRUCTION OF PARTITIONS OR CEILINGS
Jacques J. V. C. Devisme, 21 Carnot St., Bihorel-les-Rouen, France
Filed Aug. 2, 1967, Ser. No. 657,832
Claims priority, application France, Aug. 4, 1966, 72,166
Int. Cl. E04b 5/55; E04c 1/30
U.S. Cl. 52—581        2 Claims

ABSTRACT OF THE DISCLOSURE

An assembly of polygonal frames for the construction of partitions, ceilings and the like, in which the means for interconnecting the frames in juxtaposed position include bolts interconnecting adjacent frames and bars extending substantially in the plane of and across at least two juxtaposed frames and extending through the grooves receiving the bolts and under the bolts, the bars serving to reinforce the connections between adjacent frames.

---

This invention relates to an assembly of polygonal frames for the construction of partitions, ceilings and the like, characterised by the means for interconnecting the frames in juxtaposed positions, said means including bolts of trapezodial cross-section inserted in the grooves made in the adjacent frame members.

The object of the present invention is a system for assembling components for the construction of partitions or ceilings. This system is especially, but not exclusively, intended for the construction of decorative partitions or ceilings which consist in whole or in part of an assembly of perforated transparent, tranlucent or opaque components.

The invention comprises chiefly a method of carrying out the assembly by means of juxtaposed polygonal frames which may contain at least one plate, the connection of the frames to each other and to other components in the assembly being effected by bolts engaging in grooves in certain sides of the frames.

The invention further comprises certain other arrangements mentioned hereunder, preferably used simultaneously with the main arrangement described above.

The invention more particularly concerns certain ways of applying and carrying out these arrangements; still more particularly, it concerns, as new industrial products, assemblies of the type in question and the components and tools used for constructing them.

As examples only and to facilitate comprehension of the invention, a description of particular modes of execution of the invention is given below, with reference on a schematic and non-exhaustive basis to the attached drawings, in which.

Figure 1:
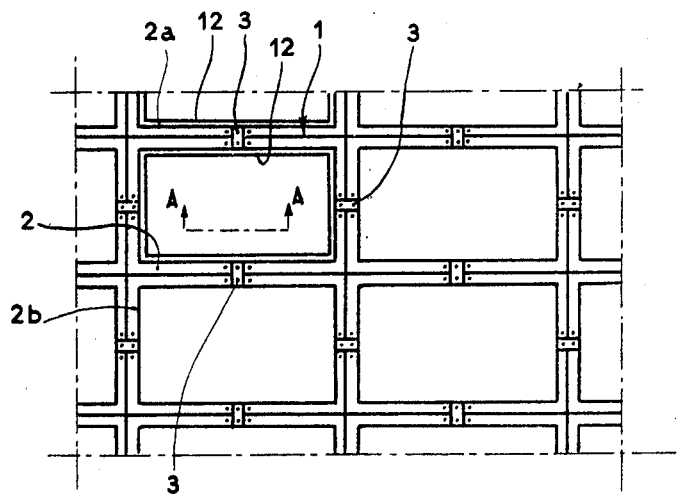
FIGURE 1 is a partial elevation of a partition constructed from an assembly of frames in accordance with the invention.
Figure 2:
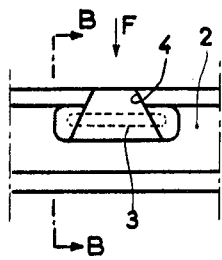
FIGURE 2 is a partial section through FIGURE 1 at A–A.
Figure 3:
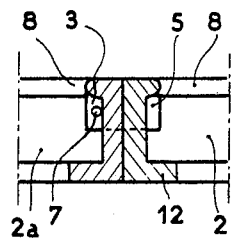
FIGURE 3 is a section through FIGURE 2 at B–B.
Figure 4:
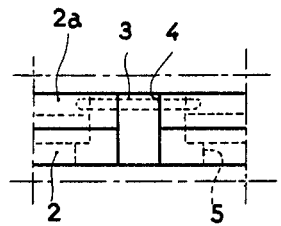
FIGURE 4 is a view in direction of the arrow F of FIGURE 2.
Figure 5:
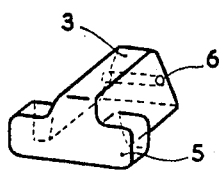
FIGURE 5 is a perspective view of one of the bolts linking the frames of this partition.
Figure 6:
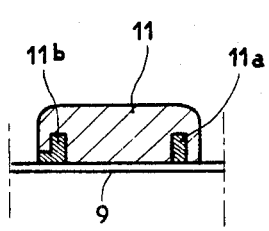
FIGURE 6 is a longitudinal section through a variant of this bolt.
Figure 7:
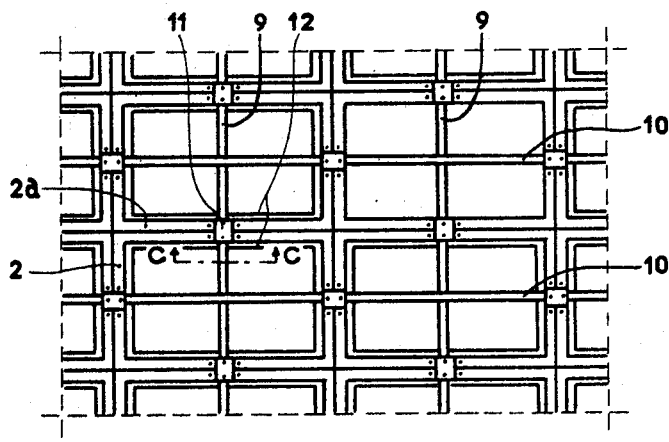
FIGURE 7 is a partial elevation of a partition constructed in accordance with the invention reinforced by two sets of bars.
Figure 8:
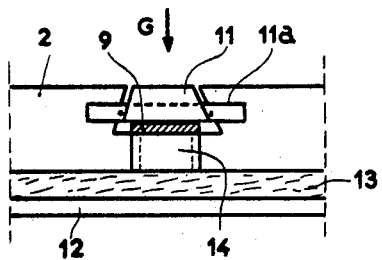
FIGURE 8 is a partial section through FIGURE 7 at C–C.
Figure 9:
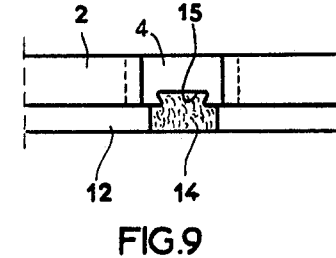
FIGURE 9 is a partial view of FIGURE 8 in the direction of arrow G, the bolt, pins and bar not being shown for greater clarity.
Figure 10:
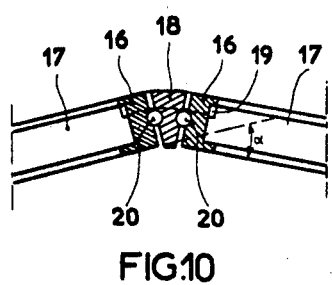
FIGURES 10 and 11 represent another frame assembly (cross-section and partial plan respectively).
Figure 11:
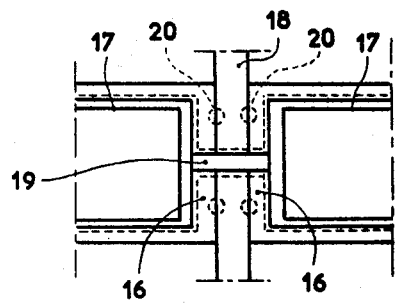

If it is proposed to produce an assembly in accordance with the invention, and more particularly according to that mode of application and those modes of construction of its various parts which it appears should be preferred, one should proceed in the following or a similar manner.

The assembly, chosen as an example, being intended for the construction of a vertical partition 1, this partition is constituted by polygonal frames 2, which, in this example, are rectangular. The frames may be made of any suitable material and in any suitable manner. Frames 2, 2a, 2b . . . are linked together by bolts 3 engaging in grooves 4 in their sides. The bolts 3 and grooves 4 have a trapezodial cross-section. To prevent the bolts sliding in their groves, the bolts 3 have a head 5 which is wider than groove 4 and a hole 6 in which a pin 7 is placed. The periphery of the frames 2 may form an internal border 8 hiding the ends of the bolts 3. Alternatively, the assembly described above may be complemented and reinforced by bars 9 and 10, which in this example form two orthogonal patterns and engage in the grooves 4 of the frames. These bars are placed under the bolts 11 linking the frames 2 of the assembly. The bolts 11 are retained by pins 11a or 11b.

The periphery of the frames 2 may also be provided with a border 12 securing the plates 13 which may be contained in each frame. The plates 13 may be coloured, transparent, translucid or opaque, to create a decorative effect. The frame might also have a bottom instead of plate 13.

Together with the border 12, the bars 9, 10 secure the plates 13. A wedge 14 may be placed between the bar, such as bar 9, and plate 13, so that one type of frame can contain plates of varying thickness. The wedge 14 is secured in a recess 15 in the side of the frame.

The frame assembly system according to the invention allows of the construction or non-plane partitions of arches. For this purpose it is possible to incline the external surfaces of certain sides of the frames, but in general it will be easier to obtain the desired curvature by placing a wedge-shaped piece 18 between the sides 16 of two adjacent frames 17. The bolt 19 may be rigid and bent at the angle α of the two frames 17; it may also be made of flexible enough material for it to be bent itself to this angle α. Where necessary, especially in the formation of arches, piece 18 may consist of a support for the frames.

The outside surfaces of the sides of the frames may have grooves and/or projections to strengthen the connections between frames themselves and between frames and other parts of the assembly. Alternatively, these connections may be reinforced by balls 20 placed in suitable recesses in the sides of the frames or components of the assembly.

Any seals required can be placed between the surfaces of the frame sides and between the plates and the borders 12.

The ends of bars, such as 9, 10, projecting beyond the sides of the outside frames of the assembly can be used as fixing legs or attachment points to support the assembly.

The frames may contain two spaced plates forming a detachable double wall. If appropriate holes are made in the sides of the frames, a heating or ventilating fluid can be admitted between the plates.

Finally, the system described is also applicable if it is

What I claim is:

1. In an assembly of juxtaposed polygonal frames, the sides of said frames having an internal face on the inside of the frame, an external face facing the external face of an adjacent frame, and front and back faces disposed side by side and substantially flush for adjacent frames, said frames having grooves of trapezoidal cross-section opening at said external and internal faces, the grooves of adjacent frame members being disposed two by two in substantial alignment, bolts of similarly shaped trapezoidal cross-section removably inserted into pairs of aligned grooves of adjacent frame members to rigidly interconnect the same, each bolt having a head at one end abutting against the inside face of one frame member, the other end of said bolt protruding from the inside face of the adjacent frame member, a pin removably inserted transversely of the protruding end of said bolt to removably retain said bolt in position in the pair of grooves, and bars extending substantially in the plane of and across at least two juxtaposed frame members and extending through said grooves and under said bolts, said bars serving to reinforce the connections between adjacent frames.

2. An assembly as claimed in claim 1, further including a recess inside of the frame, a plate mounted in said frame and wedges disposed between said plate and said bars, and engaging said recess made in the side of the frame.

References Cited

UNITED STATES PATENTS

| | | | |
|---|---|---|---|
| 2,257,001 | 9/1941 | Davis | 52—582 X |
| 2,264,176 | 11/1941 | Englehart et al. | 52—171 X |
| 2,810,941 | 10/1957 | Mainieri | 52—586 X |
| 2,871,619 | 2/1959 | Walters | 52—584 X |
| 3,101,309 | 8/1963 | Groh | 287—189.36 X |

FRANK L. ABBOTT, Primary Examiner

SAM D. BURKE III, Assistant Examiner

U.S. Cl. X.R.

52—384, 584, 663